July 14, 1953  A. VAN RYAN ET AL  2,645,726
LOAD LIMITER
Filed March 19, 1951  2 Sheets-Sheet 1

INVENTORS
Anthony Van Ryan
William R. Harry
BY
Arthur R. Woolfolk
Attorney

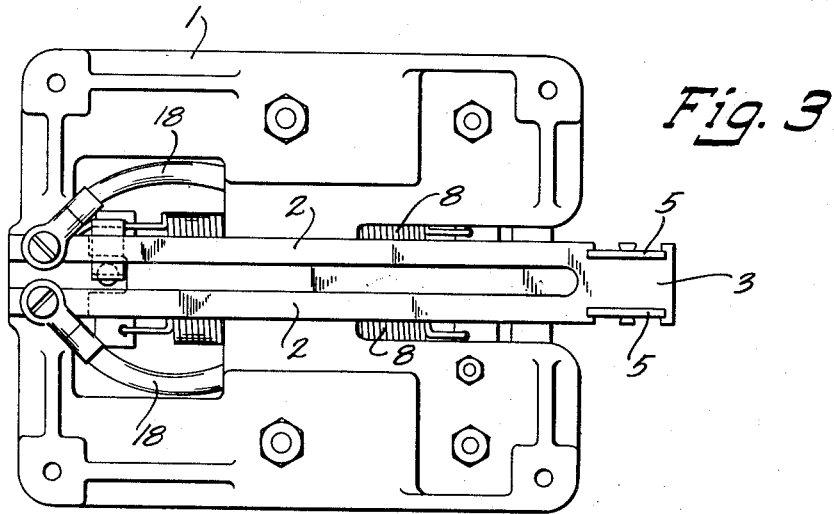
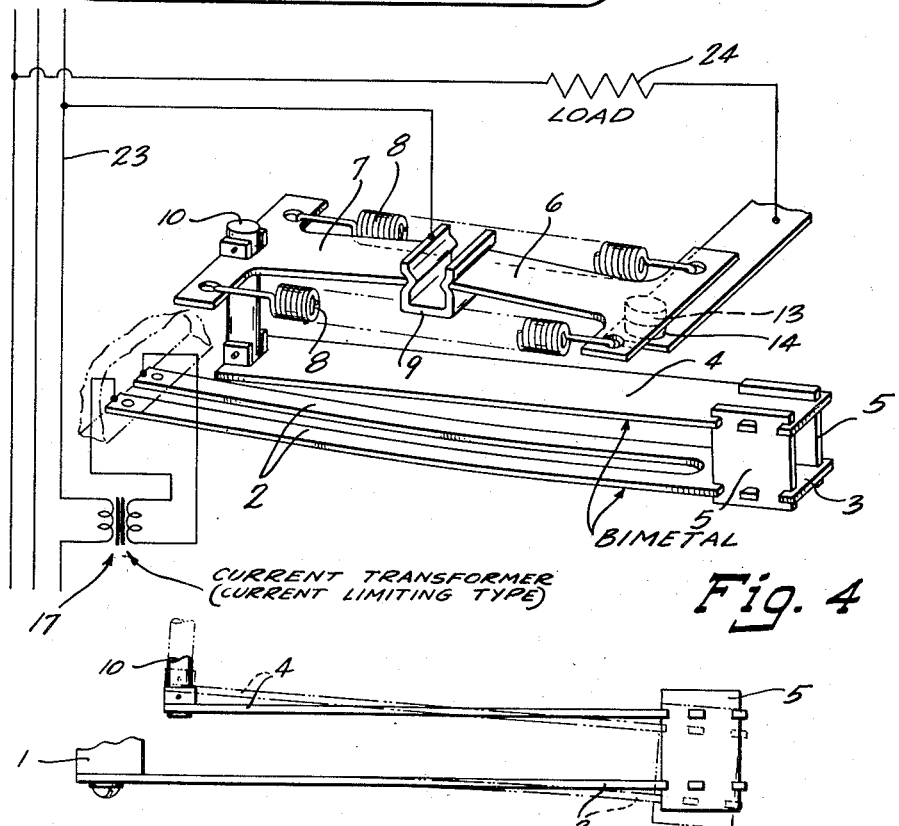
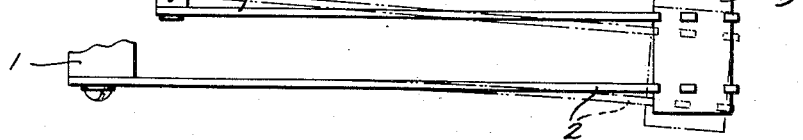

Patented July 14, 1953

2,645,726

UNITED STATES PATENT OFFICE 2,645,726

LOAD LIMITER

Anthony Van Ryan, South Milwaukee, and William R. Harry, Hartland, Wis., assignors to McGraw Electric Company, Milwaukee, Wis., a corporation of Delaware Application March 19, 1951, Serial No. 216,317

3 Claims. (Cl. 307—35)

This invention relates to a circuit breaker which is particularly useful as a load limiter.

For maximum economy of operation of an electric distribution it is desirable to avoid load peaks and yet to encourage customers to use electric power as freely as possible. This storage type electric water heater offers increased revenue but it is desirable that the load due to the water heater should be considered as an auxiliary load and not be added to the customer's peak load but, instead, should come on when there is no peak load and should be cut off whenever the preferred load, such as that due to the use of electric ranges, ironers, clothes dryers, or other large current consuming devices, increases beyond a predetermined minimum value.

This invention is designed to provide a load limiter which responds to the preferred load and controls an auxiliary load and cuts in or cuts out the auxiliary load when the prefererd load falls below or rises above predetermined minimum and maximum values.

Further objects are to provide a load limiter in the nature of a circuit breaker which is thermally operated and is compensated for ambient temperature changes, which will not operate for any brief or transient overload but only for an overload which persists for an appreciable length of time sufficient to cause heating of the thermal motor means.

Further objects are to provide a device of the above defined nature which may be very cheaply constructed, which may be installed in customers' homes, for instance, and which will reduce the peak load of each residence and which will thus reduce the peak load of any residential district.

Further objects are to provide a circuit breaker of the type outlined which is rugged and simple and which will not chatter and which will not operate due to vibration or mechanical shock.

An embodiment of the invention is shown in the accompanying drawings, in which:

Figure 3 is a bottom view of the device.

Figure 4 is a view of the operating parts removed from the remainder of the apparatus, such view showing diagrammatically the electrical circuits.

Figure 5 is a side elevation of the bimetal members showing in imaginary lines their positions when the actuator strip is loaded to a point to cause opening of the switch.

Figure 1:
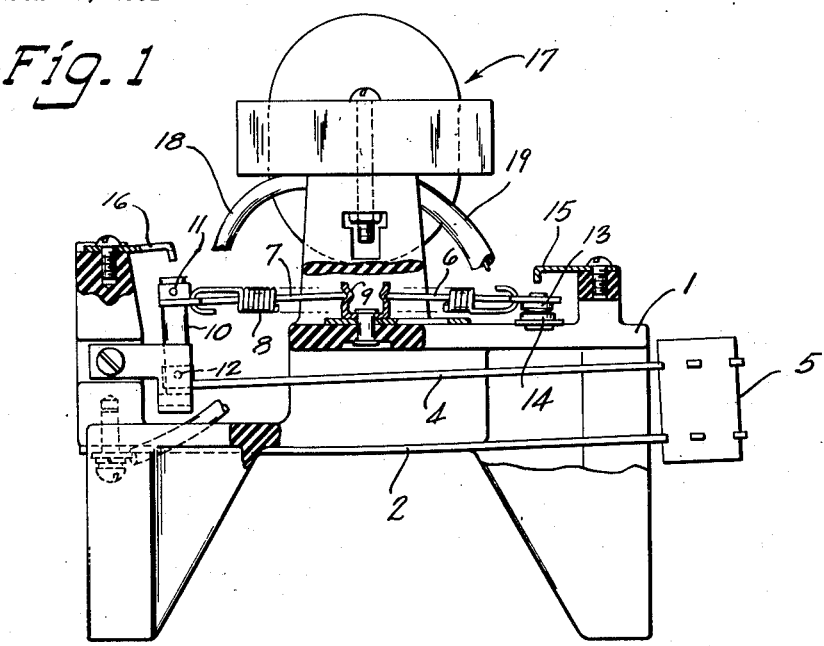
Figure 1 is a side elevation of the device with parts broken away and parts in section.

Referring to the drawings, it will be seen that the device comprises a body portion of insulating material indicated generally by the reference character 1. To the under side of this body portion, the outer ends of the legs 2 of a bimetal actuator strip are secured, the free end 3 of the bimetal actuator strip constituting its bail portion. The free end 3 of the actuator strip supports one end of the compensator bimetal strip 4. This is accomplished by providing a pair of end plates 5 secured to the two strips. The end plates 5 have electrical and thermal insulating qualities so that there will be no heat conduction from the actuator strip to the compensator strip. It is to be noted that the plates 5 are rigidly secured to both the actuator strip 2 and the compensator strip 4.

The body portion 1 supports on its upper side a snap switch which constitutes a pair of arms 6 and 7 joined by springs 8 and pivotally mounted on a conducting support 9. The arm 7 is operatively coupled to the compensator strip 4 by means of an insulating pin 10 which is pivotally joined to the members 7 and 4 as indicated at 11 and 12. The switch is so constructed that when the arm 7 is rocked past dead center the arm 6 is rocked upwardly or downwardly depending on the direction of motion of the arm 7. The arm 6 carries a movable contact 13 which coacts with a stationary contact 14 when it is in its down position and which engages a stop 15 when it is in its upper position. The pin 10 is adapted to strike a stop 16 when in its uppermost position.

The body portion 1 supports a current transformer indicated generally by the reference character 17. This current transformer is of the current limiting type.

Figure 2:
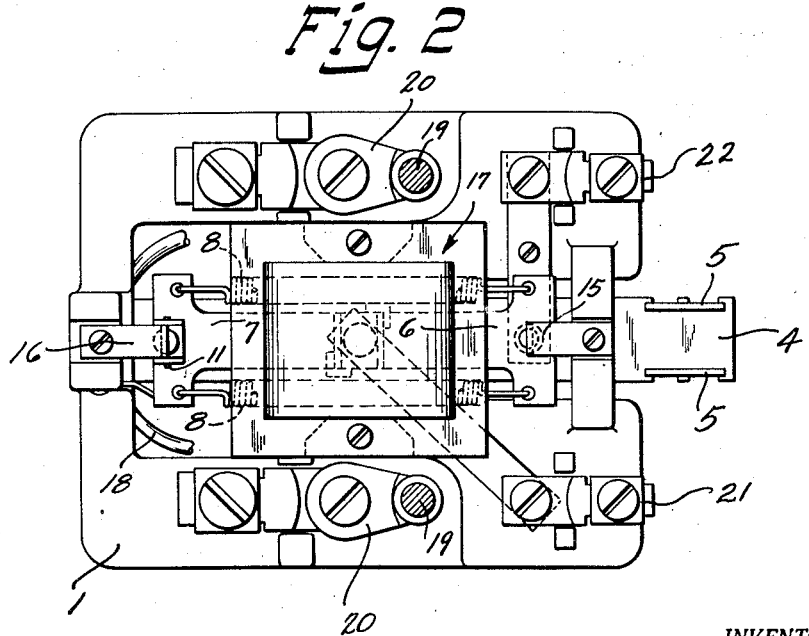
Figure 2 is a plan view of the device with parts broken away and parts in section.

The current transformer has its secondary connected as indicated at 18 to the fixed ends of the arms 2 of the actuator strip. The leads from the primary of the transformer are indicated by the reference character 19. These leads are connected to terminals 20 carried by the body portion. The conducting support 9 for the arms of the snap switch is connected to the terminal 21 and the stationary contact 14 is connected to the terminal 22, see Figure 2.

Referring to Figure 4, from which the electrical connections of the device may be ascertained, it will be seen that the primary of the transformer 17 is connected in series with the line 23 which line carries the preferential load. The current passing through the actuator strip 2, 2 is thus proportional to the current in the line 23 until a predetermined upper limit has been reached corresponding to an overload. The reason for this is to protect the actuator strip from distortion due to excessive overloads in the event of a short-circuit or other contingency of this order. The auxiliary circuit is connected to the load 24. It is to be noted from Figure 4 that the movable and stationary contacts 13 and 14 of the snap switch are connected in series with the auxiliary load circuit.

For example, in the diagrammatic showing of Figure 4 a three-wire single phase house wiring system has been indicated and the auxiliary circuit may extend to a storage water heater which constitutes the load 24. The preferential load may be that of the ordinary electrical devices employed in a home, such as electric ranges, ironers, clothes dryers, or other current consuming devices.

The operation of the apparatus is as follows:

When the preferential load exceeds a predetermined value, the bimetal actuator strip 2 is deflected downwardly as shown in Figure 5, and consequently rocks the compensator bimetal strip 4 so that its free end moves upwardly, thereby opening the switch. Under these conditions, the auxiliary circuit is opened and the desired peak load for the residence is not exceeded. On the other hand, when the preferential load drops below a predetermined value, the actuator strip bows upwardly as it cools and rocks the compensator strip 4 so that its free end moves downwardly thus closing the switch and throwing the auxiliary load on the line. This arrangement prevents excessive peak loads as has been described hereinbefore, and yet allows the auxiliary load to be carried whenever there is a predetermined minimum load in the preferred load circuit.

The compensator strip 4 is so arranged that it deflects in the same direction as the bimetal strip 2, 2 for changes in temperature. Thus it will compensate for ambient temperature variations as it is operatively interposed between the actuator strip and the switch.

The device, it will be seen, is very simple and sturdy and can be cheaply produced. It is easy to install and requires no thought on the part of the user and is substantially care-free through long periods, as there is scarcely any wear of the parts.

Further, by having the snap switch arranged so that it is biased open when in its open position and biased closed when in its closed position, it is clear that such switch is protected against inadvertent operation due to jarring.

Thus it will be seen that a load limiter has been provided by this invention which may be installed with the utmost ease and which is free from errors due to changes in ambient temperature or to inadvertent operations due to jarring.

Although this invention has been described in considerable detail, it is to be understood that such description is intended as illustrative rather than limiting, as the invention may be variously embodied and is to be interpreted as claimed.

We claim:

1. In a device of the class described, a first circuit constituting a preferential load circuit, a current transformer having its primary connected in said first circuit, a bimetal actuator strip connected to the secondary of said transformer, a second circuit constituting an auxiliary circuit, a switch connected in said second circuit and operatively connected to said actuator strip, and a compensator strip of bimetal responsive to ambient temperature and mechanically interposed between said actuator strip and said switch.

2. In a device of the class described, a first circuit constituting a preferential load circuit, a current transformer having its primary connected in said first circuit, a bimetal actuator strip connected to the secondary of said transformer, a second circuit constituting an auxiliary circuit, a switch connected in said second circuit and operatively connected to said actuator strip, and a compensator strip of bimetal responsive to ambient temperature and mechanically interposed between said actuator strip and said switch, said transformer being of the current limiting type whereby said actuator strip is protected from distortion from excessive overloads in said first circuit.

3. In a device of the class described, a U-shaped bimetal actuator strip having the ends of its legs secured to a fixed support and having its other end free, a current transformer of the current limiting type having its secondary connected to the fixed ends of said bimetal strip, a compensator bimetal strip having one end free and having its other end supported from the free end of said actuator strip, and a switch operatively connected to the free end of said compensator strip.

ANTHONY VAN RYAN.
WILLIAM R. HARRY.

References Cited in the file of this patent

UNITED STATES PATENTS

| Number | Name | Date |
|---|---|---|
| 1,743,115 | Clark | Jan. 14, 1930 |
| 1,749,718 | Randolph et al. | Mar. 4, 1930 |
| 1,995,635 | Clark | Mar. 26, 1935 |
| 2,518,361 | Mosley | Aug. 8, 1950 |
| 2,565,631 | Sander | Aug. 28, 1951 |